United States Patent [19]
Heshmat

[11] Patent Number: 5,961,217
[45] Date of Patent: Oct. 5, 1999

[54] HIGH LOAD CAPACITY COMPLIANT FOIL HYDRODYNAMIC THRUST BEARING

[75] Inventor: Hooshang Heshmat, Niskayuna, N.Y.

[73] Assignee: Mohawk Innovative Technology, Inc., Albany, N.Y.

[21] Appl. No.: 09/126,334

[22] Filed: Jul. 30, 1998

Related U.S. Application Data

[62] Division of application No. 08/827,202, Mar. 28, 1997, Pat. No. 5,833,369.

[51] Int. Cl.$^6$ .................................................. F16C 17/06
[52] U.S. Cl. .............................................. 384/105; 384/106
[58] Field of Search ..................................... 384/105, 106, 384/103, 104

[56] References Cited

U.S. PATENT DOCUMENTS

| | | |
|---|---|---|
| 3,375,046 | 3/1968 | Marley . |
| 3,635,534 | 1/1972 | Barnett . |
| 3,809,443 | 5/1974 | Cherubim . |
| 4,171,928 | 10/1979 | Emerson . |
| 4,229,054 | 10/1980 | Miller, Jr. . |
| 4,247,155 | 1/1981 | Fortmann . |
| 4,262,975 | 4/1981 | Heshmat et al. . |
| 4,274,683 | 6/1981 | Gray et al. . |
| 4,277,111 | 7/1981 | Gray et al. . |
| 4,277,112 | 7/1981 | Heshmat . |
| 4,277,113 | 7/1981 | Heshmat . |
| 4,295,689 | 10/1981 | Licht . |
| 4,296,976 | 10/1981 | Heshmat . |
| 4,300,806 | 11/1981 | Heshmat . |
| 4,415,281 | 11/1983 | Agrawal . |
| 4,459,047 | 7/1984 | Silver . |
| 4,465,384 | 8/1984 | Heshmat et al. . |
| 4,552,466 | 11/1985 | Warren . |
| 4,668,106 | 5/1987 | Gu . |
| 4,699,523 | 10/1987 | Hagemeister . |
| 5,110,220 | 5/1992 | Gu . |
| 5,248,205 | 9/1993 | Gu et al. . |
| 5,318,366 | 6/1994 | Nadjafi . |
| 5,498,083 | 3/1996 | Brown . |
| 5,547,286 | 8/1996 | Struziak . |
| 5,584,582 | 12/1996 | Brown . |

OTHER PUBLICATIONS

H. Heshmat, "Analysis of Compliant Foil Bearings with Spatially Variable Stiffness", AIAA/SAE/ASME/ASEE 27$^{th}$ Joint Propulsion Conference, Jun. 24–26, 1991, pp. 1–11, Sacramento, CA.

H. Heshmat et al, "Application of Compliant Fluid–Film Bearings To The High–Pressure Oxygen Turbopump of the SSME", 1992 Conference on Advanced Earth–To–Orbit Propulsion Technology, May 19–21, 1992, pp. 1–10, Marshall Space Flight Center, Alabama.

H. Heshmat, "A Feasibility Study on the Use of Foil Bearings in Cryogenic Turbopumps", AIAA/SAE/ASME/ASEE 27$^{th}$ Joint Propulsion Conference, Jun. 24–26, 1991, pp. 1–12, Sacramento, CA.

H. Heshmat et al, "Development of Foil Journal Bearings for High Load Capacity and High Speed Whirl Stability," ASLE–ASME Joint Lubrication Conference, Oct. 4–7, 1981, pp. 1–8, New Orleans, LA.

*Primary Examiner*—Lenard A. Footland
*Attorney, Agent, or Firm*—Hodgson, Russ, Andrews, Woods & Goodyear

[57] ABSTRACT

A compliant hydrodynamic fluid film thrust bearing. A circumferential row of sectors of flexible sheets are positioned to face a shaft runner for relative rotation therebetween. The flexible sheets are supported by a flexible membrane which is in turn supported by a pair of rows of corrugated foil elements. Flexible strips are sandwiched between the trailing portions of the flexible sheets and the flexible membrane to provide a tapered/land effect. The corrugated foil elements are supported by a flexible diaphragm which is in turn supported by a row of corrugated support elements which are attached thereto along circumferentially intermediate portions thereof and are aligned with the flexible strips to provide a crowning effect. The ridges of at least one of the pair of rows of corrugated foil elements have truncated apex portions. In one embodiment, ridges in corrugated foil elements of one row thereof underlie only some ridges in the other row, and furrows underlie the other ridges.

20 Claims, 7 Drawing Sheets

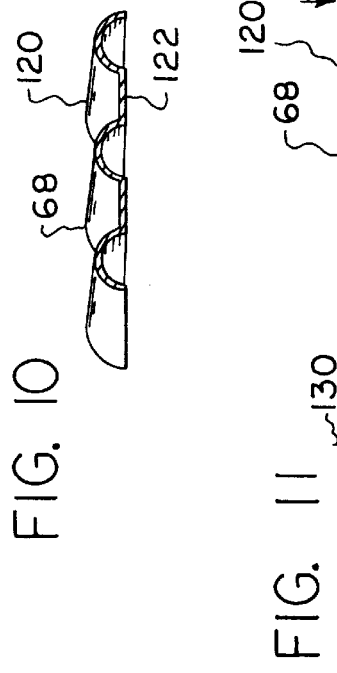
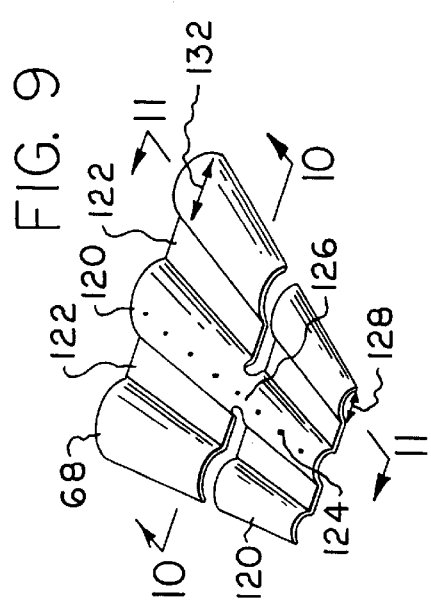
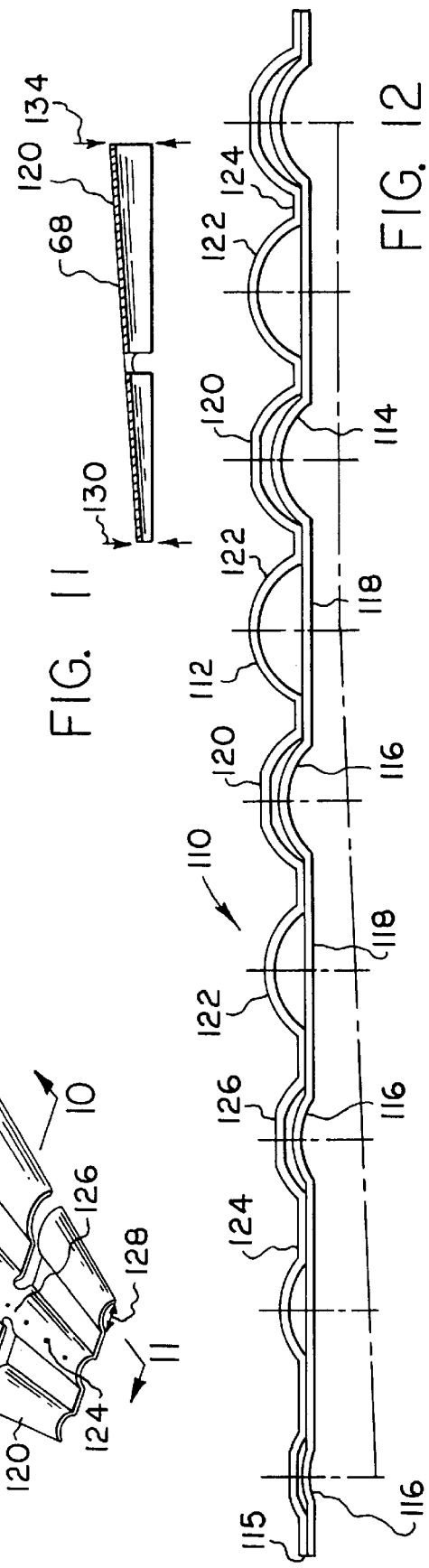
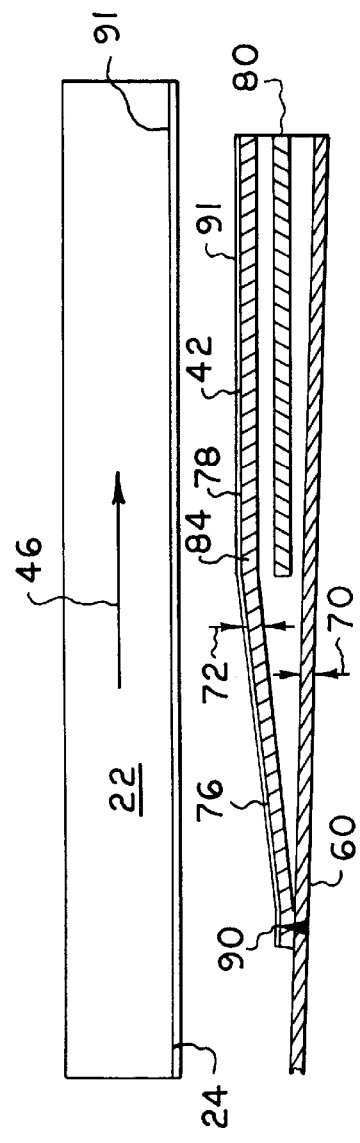

HIGH LOAD CAPACITY COMPLIANT FOIL HYDRODYNAMIC THRUST BEARING

This is a division of pending application Ser. No. 08/827,202, filed Mar. 28, 1997, which is incorporated herein by reference now U.S. Pat. No. 5,833,369.

The present invention relates generally to compliant foil hydrodynamic fluid film thrust bearings.

My U.S. patent application titled "High Load Capacity Compliant Foil Hydrodynamic Journal Bearing," which is filed on the same date as this application is filed, is incorporated herein by reference.

Compliant hydrodynamic gas thrust bearings are being used in high performance machinery which is subject to extreme conditions of temperature and speed. These bearings are ideally suited for these conditions because they do not suffer from the speed and durability limitations of rolling element bearings and because they do not require oil lubrication and therefore do not require oil circulation, seals, and conditioning equipment necessary for use in oil bearings.

A compliant hydrodynamic fluid film thrust bearing ordinarily employs one or more bearing pad assemblies each including a resilient corrugated supporting element and an attached overlying thin bearing sheet. The pads are mounted on the surface of a mounting member in bearing relationship to a relatively rotating short thrust runner. According to the theory of the hydrodynamic compliant fluid film bearing, a hydrodynamic supporting fluid film is generated by the relative movement of the thrust runner over the bearing sheet to support the thrust runner on a thin cushion of fluid. The spring-like compliance of the corrugated supporting element underlying the bearing sheet enables it to deflect to assume a profile relative to the thrust runner surface which is productive of a supporting pressurized fluid cushion over the pad. It also enables the bearing sheet to conform, to some extent, to misaligned, unbalanced, and thermally or mechanically distorted rotating members.

Examples of compliant foil hydrodynamic thrust bearings are found in my prior U.S. Pat. Nos. 4,277,112; 4,277,113; and 4,296,976 and in U.S. Pat. Nos. 3,809,443 and 4,277,111. These patents disclose features and teachings which may be incorporated in the bearings described in this application and are therefore incorporated herein by reference.

Additional examples of compliant foil hydrodynamic thrust bearings are found in U.S. Pat. Nos. 3,375,046; 3,635,534; 4,171,928; 4,247,155; 4,459,047; 4,668,106; 5,110,220; 5,248,205; 5,318,366; and 5,547,286 which are also incorporated herein by reference.

Other art which may be of interest includes U.S. Pat. Nos. 4,295,689; 4,415,281; 4,552,466; 4,699,523; 5,498,083; 5,584,582; 4,262,975; 4,465,384; 4,300,806; 3,809,443; 4,229,054; and 4,274,683.

Oil free compliant surface bearings are considered to be attractive alternatives to conventional bearings when high speed, long life extreme environments (from cryogenic to high temperatures) are expected and/or contamination free operation is required. Higher load capacities may make applications, utilizing a high temperature polymer lubricant coating, described herein, in turbo-alternators, auxiliary power units, small gas turbine engines, and extreme environment applications possible.

The corrugations of the compliant foil support may be tailored to provide the desired bearing stiffness and damping to meet specific system dynamic requirements. For example, see my paper No. AIAA-91-2102 entitled "Analysis of Compliant Foil Bearings with Spatially Variable Stiffness," given at the AIAA/SAE/ASME/ASEE 27'Joint Propulsion Conference, Sacramento, Calif., Jun. 24–26, 1991, which is hereby incorporated herein by reference, and my prior aforesaid U.S. Pat. No. 4,300,806. This paper discloses varying stiffness by placing one bump foil over another bump foil or by varying bump height and using multi-layered top smooth foils or by varying the thickness, pitch, etc. of the foils.

My aforesaid 1991 paper contains a theoretical discussion, but does not disclose a practical embodiment, relative to the desirability of providing a composite compliant foil thrust bearing wherein the leading portion of a sector has a constant slope following which the surface is parallel to the runner and wherein the pad consists of an upstream ramp or tapered portion followed by a flat section.

Conventional rigid-type thrust bearings have been provided which incorporate such tapered/land geometries to effect high load capacities, lower side leakages, and flat surfaces for supporting the load during starts and stops and otherwise low speeds, to thus reduce wear.

Conventional gas-lubricated rigid pad thrust bearings have been provided which have crown profiles in the direction of rotation in order to achieve high load capacities over flat tapered profiles when operating at full speed (hydrodynamic regime). However, at low speeds such as during starts and stops, such a profile affords only a minimum surface area for supporting the load, thus resulting in high wear.

It is considered desirable to provide improvements to compliant foil hydrodynamic thrust bearings so that higher load capacities may be achieved with minimum wear at high speeds.

It is accordingly an object of the present invention to provide a compliant foil hydrodynamic thrust bearing which has such a higher load capacity.

It is a further object of the present invention to provide such a bearing which has minimum wear and high operating speeds.

In order to provide such a thrust bearing, in accordance with the present invention, a circumferential row of sectors of flexible sheets are positioned to face the shaft runner for relative rotation therebetween,and flexible strips are sandwiched between each of the trailing portions of the flexible sheets and resiliently supporting means therefor, which preferably includes, but does not necessarily include, a flexible membrane (the space between the leading portions of the flexible sheets and the flexible membrane being free of such strips or the like) for providing an effect of circumferentially spaced raised lands with the leading portions of the sectors sloping upwardly thereto. The resiliently supporting means may include one or more corrugated foil elements.

Further in accordance with the present invention, in order to provide a crowning effect while maintaining a maximum surface contact area for supporting a load, a flexible diaphragm is provided to underlie the one or more foil elements, and a plurality of circumferentially spaced foil elements are provided between the bearing backing member and the flexible diaphragm for resiliently supporting it. These foil elements are aligned under the flexible strips and are attached to the flexible diaphragm at an intermediate position circumferentially thereof so that the circumferential edges thereof are free so as to impart a complementary crowning effect with the raised land effect. The ridges thereof increase in width and height as they extend radially outwardly so as to be semi-conical in form to provide the bearing with a softer periphery to thereby improve self-alignment capability.

In order to achieve three levels of stiffness for increased capacity, in accordance with the present invention, the bearing has inner and outer resilient corrugated foils wherein inner foil ridges underlie only some (not all) of the outer foil ridges.

In order to accommodate sliding of one ridge within another so that they do not lock-up resulting in a drastic increase in stiffness or permanent deformation, in accordance with the present invention, the ridges of at least one of the foils have truncated apex portions so that tangential line contact therebetween is avoided.

The above and other objects, features, and advantages of the present invention will be apparent in the following detailed description of the preferred embodiments thereof when read in conjunction with the accompanying drawings wherein the same reference numerals denote the same or similar parts throughout the several views.

BRIEF DESCRIPTION OF THE DRAWINGS

FIG. 6 is a sectional enlarged view, with elements partially pulled away from each other, taken along lines 6—6 of FIG. 5.

FIG. 9 is an enlarged perspective view of one of the crowning bump foils therefor.

FIG. 10 is a section view taken along lines 10—10 of FIG. 9.

FIG. 11 is a section view thereof taken along lines 11—11 of FIG. 9.

FIG. 12 is a side edge view of an alternative embodiment of the bump foils for the flexible membrane therefor.

DETAILED DESCRIPTION OF THE PREFERRED EMBODIMENTS

Figure 1:
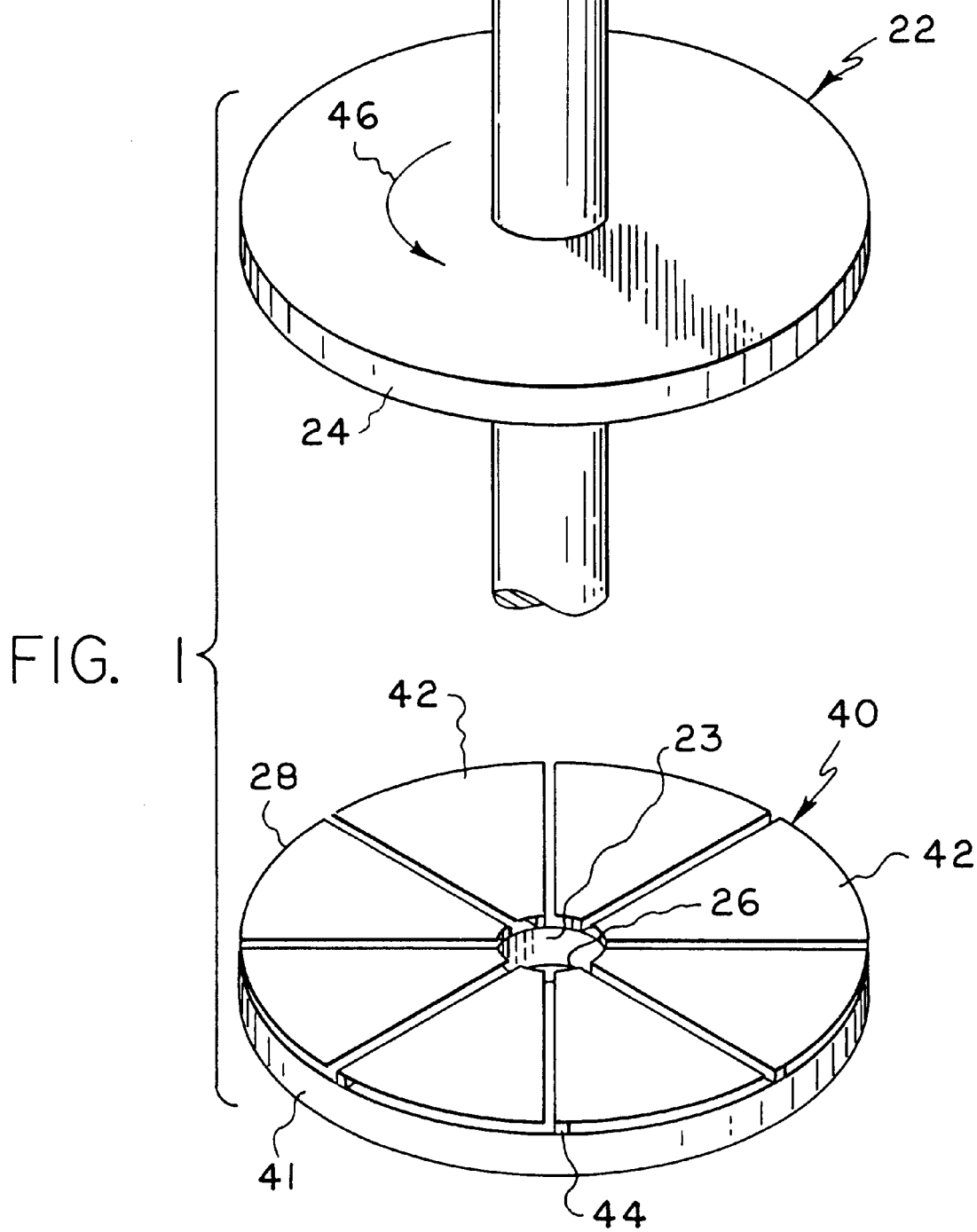
FIG. 1 is a perspective and partially developed view of a thrust bearing which embodies the present invention.
Figure 2:
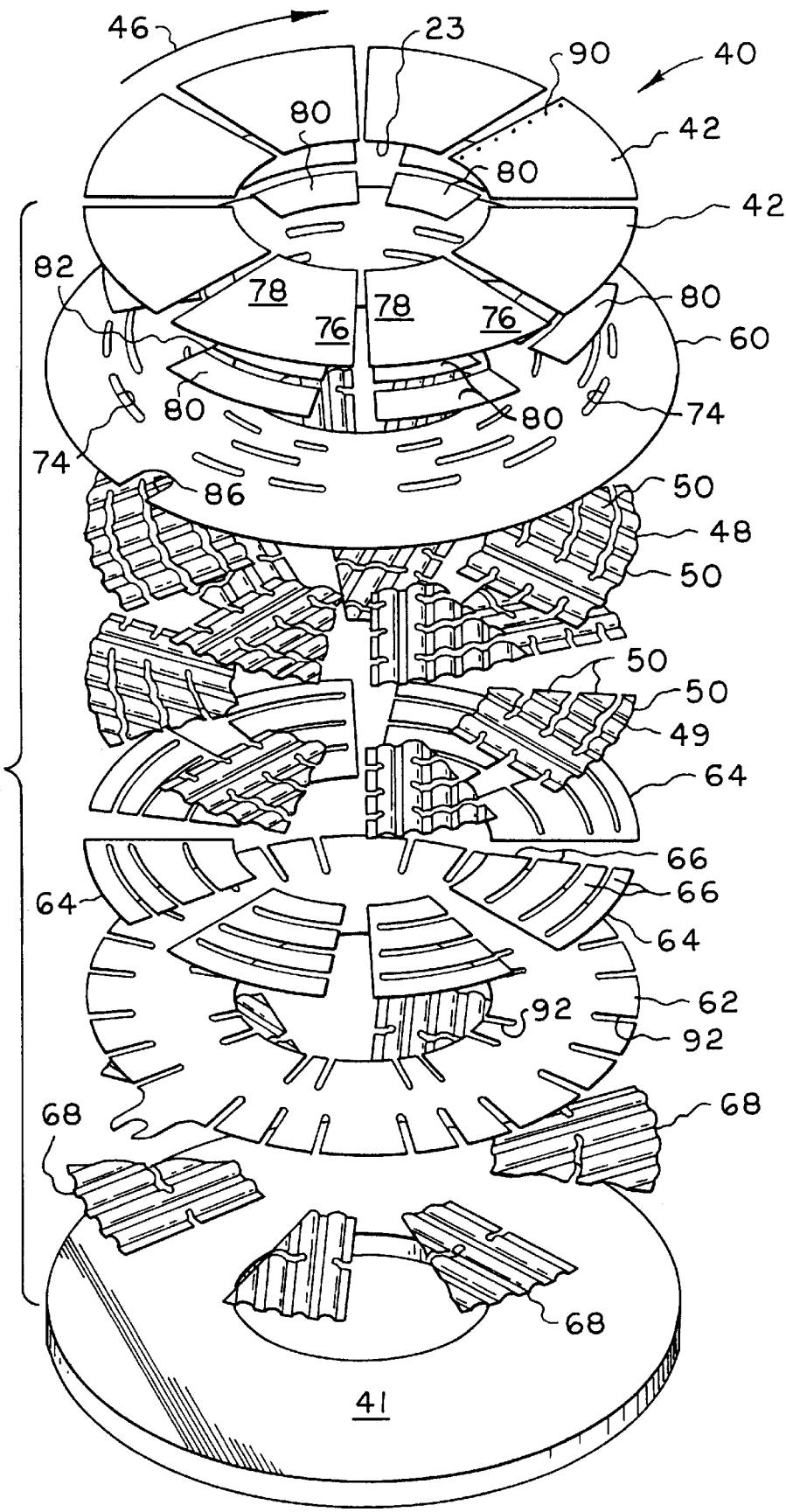
FIG. 2 is an exploded view of the bearing.

Referring to FIGS. 1 and 2, there is shown generally at 40 a compliant hydrodynamic fluid film thrust bearing for supporting the axial thrust 19 of a rotating shaft 20. The shaft 20 is received within a central opening, illustrated at 23, which is enlarged relative to the shaft and which extends axially through the bearing 40. A thrust runner 22 having a downwardly facing bearing surface 24 is fastened to the shaft and rotates with it. The axial thrust 19 of the shaft 20 is borne by a thrust bearing assembly 44 which is fastened to the top surface of a thrust plate 41. The thrust plate 41 is usually stationary relative to the machine frame, but in some applications it is advantageous for both the rotor and the thrust plate to rotate. The invention is usable with various forms of relative rotation between the thrust plate and thrust runner. Although the thrust plate 41 is shown to have a flat surface facing the thrust runner 22, it should be understood that the present invention covers other configurations thereof such as, for example, wherein the thrust plate 41 has a concave or dished surface facing the thrust runner and wherein the thrust runner 22 is conical.

The thrust bearing assembly 44 includes a circumferential row of thin resilient sheets 42 for facing the shaft runner 22 for relative movement therebetween. Each sheet 42 is in the form of a truncated sector having an inside periphery 26 at the periphery of the opening and outside periphery 28 at the periphery of the bearing. Each sheet 42 and the respective portion of the bearing assembly underlying it may be said to constitute a bearing pad. Eight such bearing pads or sheets are illustrated in FIG. 1. However, fewer or more such bearing pads or sheets can be used. The rotation of the thrust runner 22 in the direction shown by the arrow 46 generates a hydrodynamic fluid film over the thrust sheets 42 which supports the runner and separates it from the bearing sheets 42. The hydrodynamic fluid film is created by the viscous or shear forces acting in the fluid parallel to the direction of the relative movement between the bearing surface 24 of the thrust runner 22 and the bearing surface of the bearing sheets 42. The bearing surface 24 of the runner drags the boundary layer of fluid with it as it rotates over the bearing sheets, and the boundary layer in turn drags in the layer of fluid immediately adjacent to it, and in this way a velocity gradient is established in the fluid in the gap between the thrust runner and the bearing sheets. As illustrated in my aforesaid U.S. Pat. No. 4,277,112, the gap between the bearing sheet and the thrust runner bearing surface 24 is wedge shaped, tapering in the direction of movement of rotating bearing surface 24. The pressure of the fluid drawn into the wedge shaped gap tends to increase toward the narrow end of the gap thus creating the pressurized cushion of fluid film which dynamically supports the rotating thrust runner.

The bearing sheets 42 are supported by a flexible membrane 60 which is in turn supported on a pair of outer and inner circumferentially extending rows of corrugated compliant support elements 48 and 49 respectively to enable the bearing sheets 42 to conform to the plane of the bearing surface 24 of the rotating rotor 20 despite conditions which cause permanent or transient skew between the thrust runner bearing surface 24 and the plane of the thrust plates 42. These conditions include, among others, bearing or rotor misalignment, thermal distortion, centrifugal growth of the runner, and rotor runout due to eccentric loads or rotor imbalance. The compliant support elements 48 and 49 are provided to deflect and recover to support the bearing sheet 42 in correct hydrodynamic relationship to the bearing surface 24 of the rotating thrust runner 22 despite these conditions.

The bearing 40 may be constructed without a flexible membrane 60, and the present invention is intended to cover such an embodiment.

Figure 3:
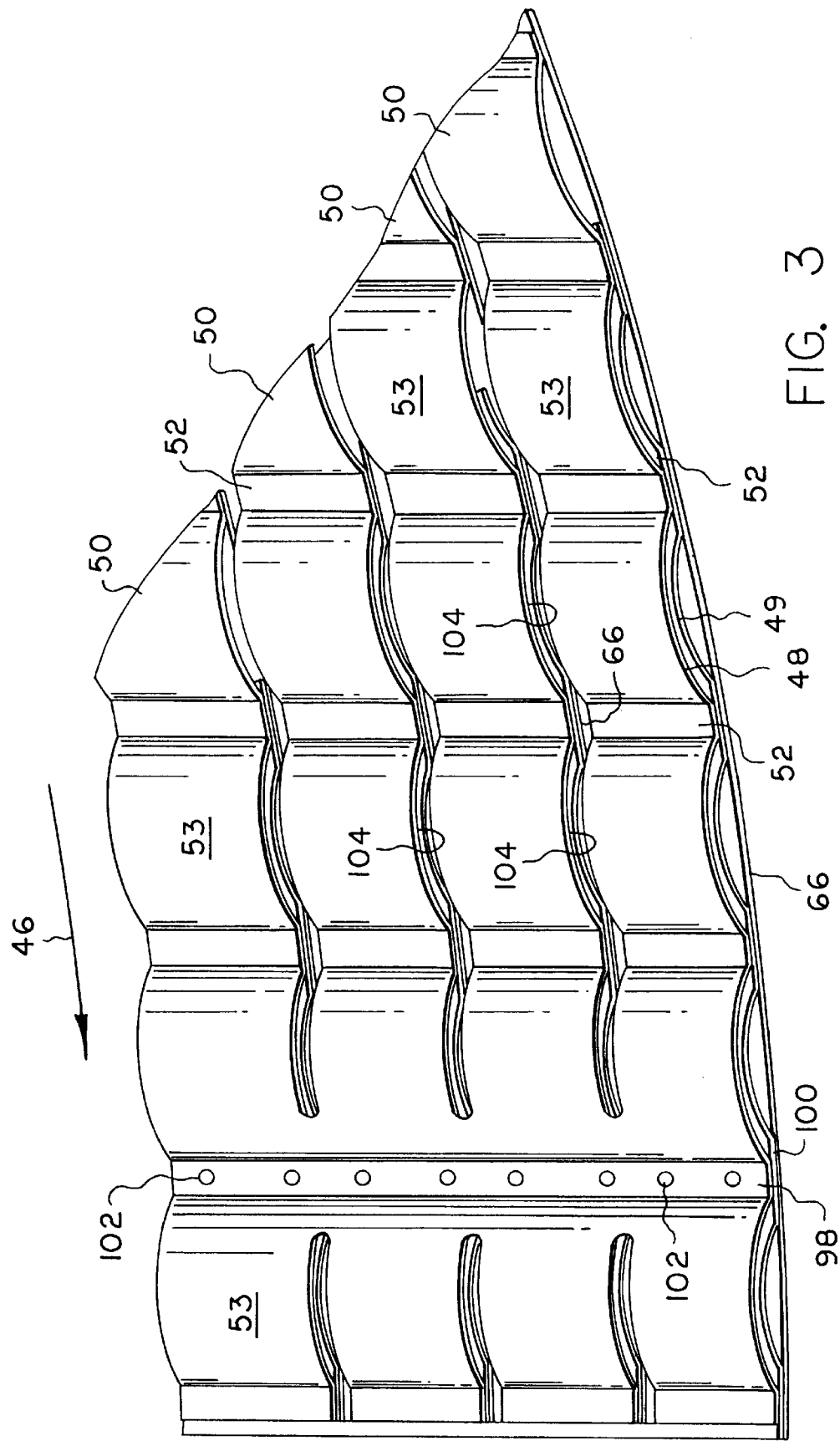
FIG. 3 is a perspective view of a bump foil assembly for a flexible membrane for the bearing.

As seen in Fig. 3, the resilient support elements or bump foils 48 and 49 are spring metal resilient elements in the form of corrugated or wavy springs having resilient elevations or ridges or bumps 53 separated by flat valley floors or furrows 52. Alternatively, the bump foils may take another suitable shape such as the form of a sine wave. The conformance of the bearing sheet 42 to the plane of the bearing surface 24 of the thrust runner 22 is facilitated by slitting by means of slits 104 each of the support elements 48 and 49 into a plurality of radially adjacent strips 50, as described in greater detail hereinafter. The sheet is slitted prior to forming into the corrugated form, and the bump foils are positioned so that the strips and bumps of the inner bump foil are aligned with the strips and bumps respectively of the outer bump foil.

Supportively underlying the inner bump foils 49 is a flexible diaphragm 62. Sandwiched between the flexible diaphragm 62 and bump foils 49 is a circumferential row of sectors 64 each of which comprises a plurality of perhaps four radially side-by-side flexible strips 66 which underlie and are aligned with the radially side-by-side strips 50 respectively into which each of the bump foils 48 and 49 is divided by the slits 104. Sandwiched between the flexible diaphragm 62 and the backing plate 41 is a circumferential row of sector-shaped corrugated resilient spring metal support elements or bump foils 68. The various components of the bearing 40 will be described in greater detail hereinafter. Unless otherwise specified, the terms "inner" and "outer" are meant to refer to direction axially with components closer to the backing plate 41 being inwardly of components farther from the backing plate 41. Similarly, the terms "top" or "upper" or the like are meant to refer to components or items being farther from the backing plate 41. The term "radially" is meant to refer to a direction toward or away from the central opening 23, and the term "axially" is meant to refer to a direction parallel to the central opening 23. All of the components of the bearing assembly 44 are composed of suitable sheet metal or other suitable material.

The provision of a relatively thick flexible membrane 60 allows the smooth resilient sheets 42 to be made very thin without their sagging between the bump foil ridges 53 in order to enhance their flexibility in all directions so as to manage shaft misalignment and excursions and thus provide optimal conformity to the thrust runner surface 24 so that higher load capacities may be achieved. For example, whereas a smooth top sheet for a conventional 7 inch OD, 1½ inch ID, liquid lubricated 500 psi compliant foil hydrodynamic thrust bearing, which does not have a flexible membrane, may have a thickness of typically about 0.16 inch, by providing a flexible membrane 60 having a thickness, illustrated at 70 in FIG. 6, of perhaps about 0.02 inch, the thickness, illustrated at 72 in FIG. 6, of each of the smooth resilient sheets 42, for such a bearing may be perhaps about 0.020 inch.

Radially-spaced rows of circumferentially-extending slots, illustrated at 74, are provided in the flexible membrane 60 about the circumference thereof to improve radial compliance of the bearing and enable it to accommodate excursions of the thrust runner as well as to enable cooling of the outer smooth sheets 42.

Relative to thrust runner rotation 46, each of the resilient sheets 42 has a leading portion, illustrated at 76, and a trailing portion, illustrated at 78, wherein a point on the thrust runner passes over the leading portion before passing over the trailing portion.

In order to achieve self-produced optimum wedge film profiles at operating speeds in order to generate superior hydrodynamic pressure profiles for higher load capacity while maximizing contact surface area at start-up and shut-down conditions, the bearing 40 is provided with a crowned tapered/flat land configuration. Thus, referring to FIG. 6, in accordance with the present invention, in order to achieve such a tapered/land configuration, sandwiched between the leading portion 76 of each resilient sheet 42 and the flexible membrane 60 is a sector-shaped set of perhaps four elongate radially side-by-side resilient flat strips 80, which may desirably be thin strips of arciform.

While a number of flat strips 80 are desirably sandwiched between the trailing portion of each resilient sheet 42 and the flexible membrane 60 in order to provide optimum conformity radially, a single sector-shaped flat strip may, if desired, be provided instead. In order to aid in manufacturing, a set of flat sheets 80 may be stamped so that they are held together by a very weak edge, illustrated at 82, to allow ease of positioning for welding but without affecting the stiffness qualities of the bearing. Alternatively, the strips 80 may be entirely separate from each other and individually positioned and welded.

FIG. 6 shows the strips 80 to extend over a distance circumferentially which is equal to about one-half to two-thirds of the distance circumferentially over which the corresponding smooth sheet 42 extends. FIG. 6 also shows the tapered/land configuration with the flat lands, illustrated at 84, providing substantial surface area for reduced wear at low speeds such as starts and stops and the leading portion 76 of the smooth sheet 42 sloping upwardly (outwardly) thereto in the desired tapered configuration.

A suitable slot 86 and diametrically opposite aperture 88 are provided in the radially outer edge of the flexible membrane 60 for receiving anti-rotation pins (not shown) for anchoring thereof to the backing plate 41 in accordance with principles commonly known to those of ordinary skill in the art to which this invention pertains. The leading edges of the smooth sheets 42 are tack-welded, as illustrated at 90, or otherwise suitably attached to the flexible membrane 60. The resilient strips 80 are suitably attached such as by spot-welding to the flexible membrane 42 along their trailing edges.

In addition to forming the tapered/land configuration, the resilient strips 80 are also provided to reinforce and strengthen the smooth top sheets 42 during dry contact (starts and stops) with the thrust runner 22 and to enhance the pad stiffness gradient from the leading to the trailing edges of the top sheets 42. The resilient strips 80 are provided to be narrow radially so as to not restrain the conformability of the smooth top sheets 42 and flexible membrane 60.

A thin dry film coating, illustrated at 91 in FIG. 6, is applied to the bearing surfaces, i.e., the surface 24 of runner 22 and the outer surface of each of the smooth top sheets 42 to provide wear resistance during start and stop rubs. For most ambient air and temperature applications and for the cryogenic environment, coatings 91 which are considered desirable include soft coatings such as polyamide-imide, PTFE or molybdenum disulfide, or tungsten disulfide. These coatings are generally applied via air brush or air spray onto the surfaces to be coated, suitably cured, and burnished using abrasive papers to achieve a smooth finish. For the runner surface 24, a hard coating such as nickel plating or a carbide coating may instead be applied. For bearings for high temperatures up to about 815 degrees C., plasma sprayed wear resistant coatings may be used. To achieve smooth surfaces for plasma sprayed coatings, they are suitably ground and lapped after application. It may be desired to apply hard sputtered coatings on the smooth top sheets 42 and plasma spray coatings on the thrust runner 22.

Figure 7:
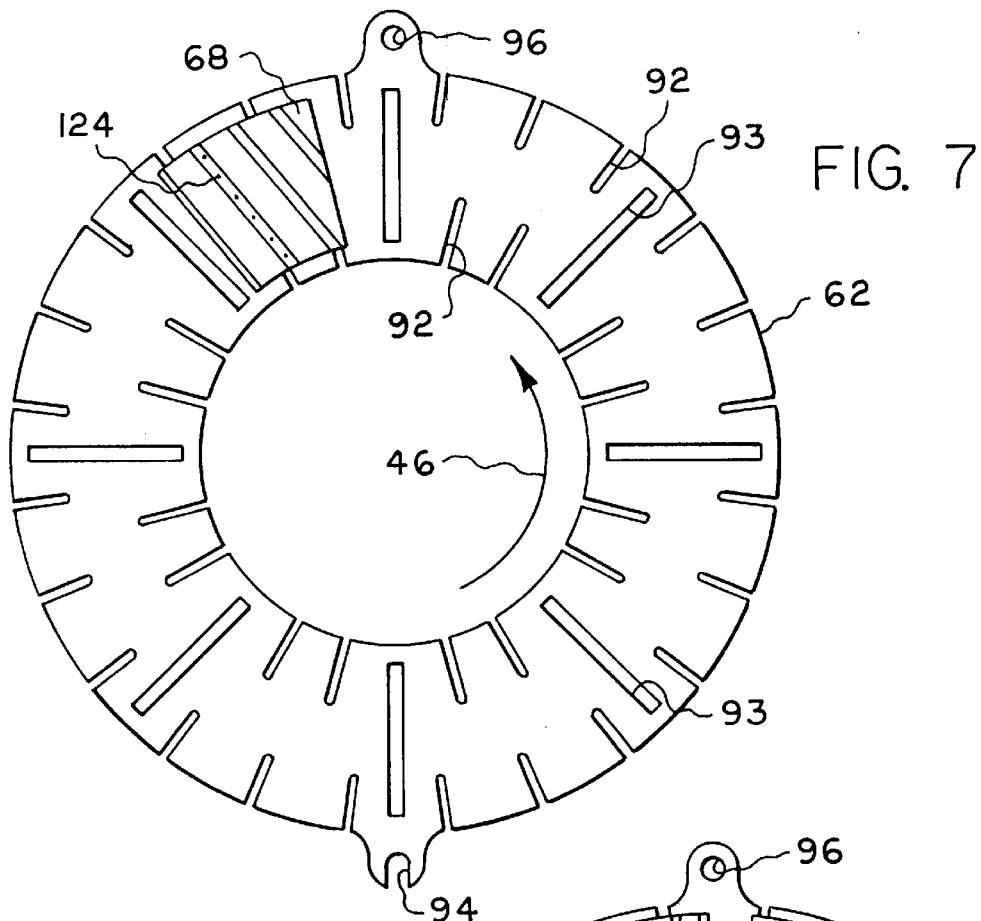
FIG. 7 is an underneath view of the flexible diaphragm therefor and illustrating a crowning bump foil spot-welded thereto.
Figure 8:
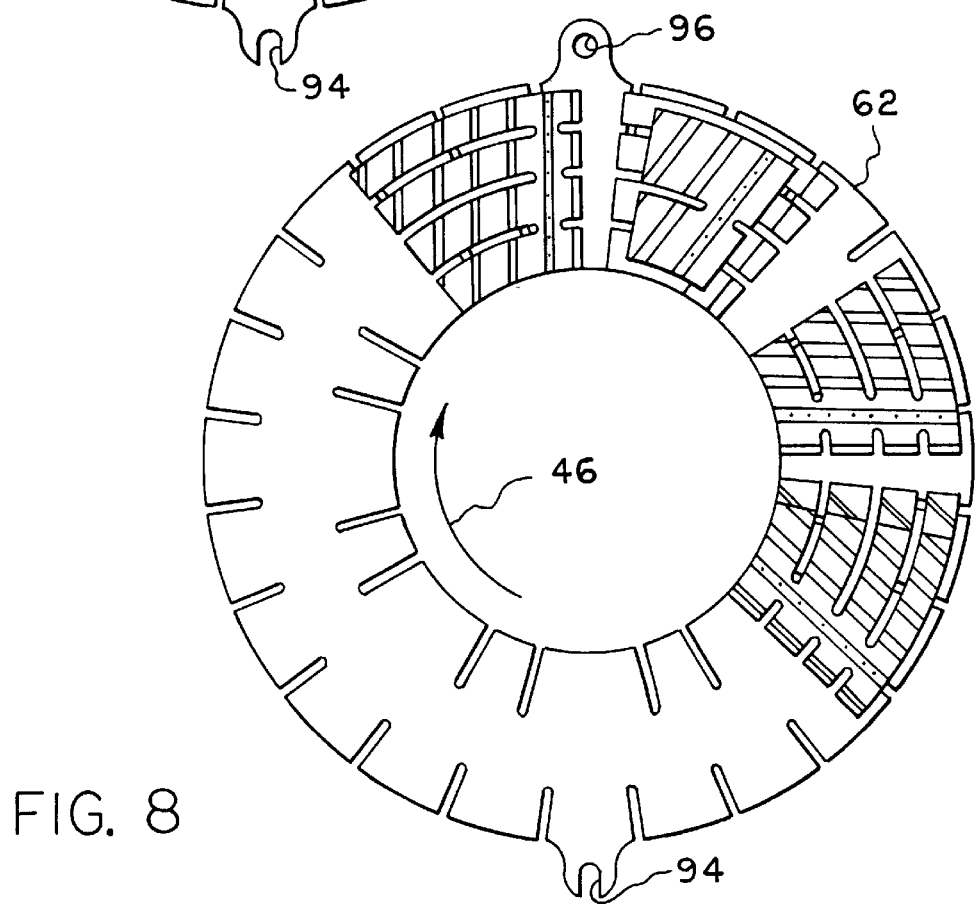
FIG. 8 is a plan view (taken from above) of the flexible diaphragm and illustrating the spatial relation of the overlying bump foils thereto.

The bump foils 48 and 49 and the resilient flat elements 66 are tack-welded or otherwise suitably attached to the flexible diaphragm 62 as hereinafter discussed and arranged to provide a springy or resilient support to the flexible membrane 60 and the smooth top sheets 42 mounted thereon so that the smooth top sheets 42 may suitably deflect under load to provide compliance with the thrust runner. This compliant support structure provides a stiffness gradient both circumferentially and radially to enable the smooth top sheets 42 to assume the tapered/land configurations under hydrodynamic action. The flexible diaphragm 62 has a plurality of slots, illustrated at 92, extending radially in both of its radially inner and outer edges and spaced about the circumference thereof to improve the compliance of the bearing and enable the bearing to accommodate excursions of the thrust runner. Referring to FIG. 7, projecting downwardly from the under surface of flexible diaphragm 62 are 8 narrow portions which extend radially substantially between the radially inner and outer edges and which are generally equally spaced circumferentially thereof. These projections 93 are positioned to each lie between a pair of crowning bump foils 68 to act as a spacer block or resting device, i.e., crowning of each pad takes place between two spacer blocks. The height of the crowning bump foils 68 is greater than the spacer block thickness (axially) by perhaps about 20 to 30 percent, generally uniformly over the lengths (radially) thereof, i.e., if the bump foils 68 decrease in height as they extend radially, the spacer block thickness will similarly decrease as the spacer blocks extend radially. The spacer blocks thus act as stoppers, limiting the amount of deflection of the crowning bump foils 68. The spacer blocks may be integral with or spot welded or otherwise suitably attached to the flexible diaphragm 62 (as shown) or spot welded or otherwise suitably attached to the bearing plate 41. In some cases, the bearing assembly may be suitably fastened to the bearing plate 41 through the spacer blocks 93 for additional strength in maintaining the bearing from rotation. The spacer blocks 93 may be spot welded or otherwise suitably attached to both the flexible diaphragm 62 and the bearing plate 41 thereby preforming the crowning bump foils by perhaps 20 to 30 percent thereby adding stiffness to the crowning bump effect. Similarly as for flexible membrane 60, the flexible diaphragm 62 has a suitable slot 94 and diametrically opposite aperture 96 on its radially outer edge for receiving the anti-rotation pins for anchoring thereof to the backing plate 41. After the flexible diaphragm 62 is thereby secured, the flexible membrane 60 is suitably positioned and anchored as previously discussed. Thus, the sub-assembly of the smooth sheets 42 and resilient flat strips 80 attached to the flexible membrane 60 and the sub-assembly of the bump foils 48 and 49 and resilient flat strips 66 attached to the flexible diaphragm 62 are mounted to the bearing pedestal 41 to be free of each other yet to operate in unison to self-equalize the bearing with the aid of the crowning bump foils 68, which act as supporting contact points with the bearing pedestal 41.

Referring to FIG. 3, a pair of bump foils 48 and 49 and set of resilient flat strips 66 as a unit underlie each of the smooth top sheets 42. As seen in FIG. 3, the furrows 52 may comprise generally flat portions which engage the resilient strips 66. The bumps 53 are semi-circular or otherwise arcuate in shape and face upwardly or outwardly so that they flex under load to bear against the flexible membrane 60 and provide compliant support (in the nature of a spring) for the respective smooth compliant sheet 42. It should be understood that embodiments wherein the bumps 53 face downwardly or inwardly toward flexible diaphragm 62 as well as embodiments wherein the bump foils have a sinusoidal shape are meant to come within the scope of the present invention. The corrugated foils 48 and 49 are desirably composed of metal or, for some applications, thermoplastic material, which material is fatigue-resistant, has good spring properties, and has strong mechanical strength. For example, the corrugated foils may be composed of nickel-based steel or a beryllium-copper or beryllium-bronze alloy.

Many ways are well known, by those of ordinary skill in the art to which this invention pertains, for manipulating the sizes and shapes of the bumps 53 and for positioning them relative to bumps on other foils to achieve the bearing stiffness and damping needed to meet specific system dynamic requirements. For example, bump foils may be provided which have bumps of successively increasing heights and lengths in order to vary stiffness gradient circumferentially along the foil. For another example, bump foils may be provided which have bumps of greater height and length alternating with bumps which have a lesser height and length.

Figure 4:
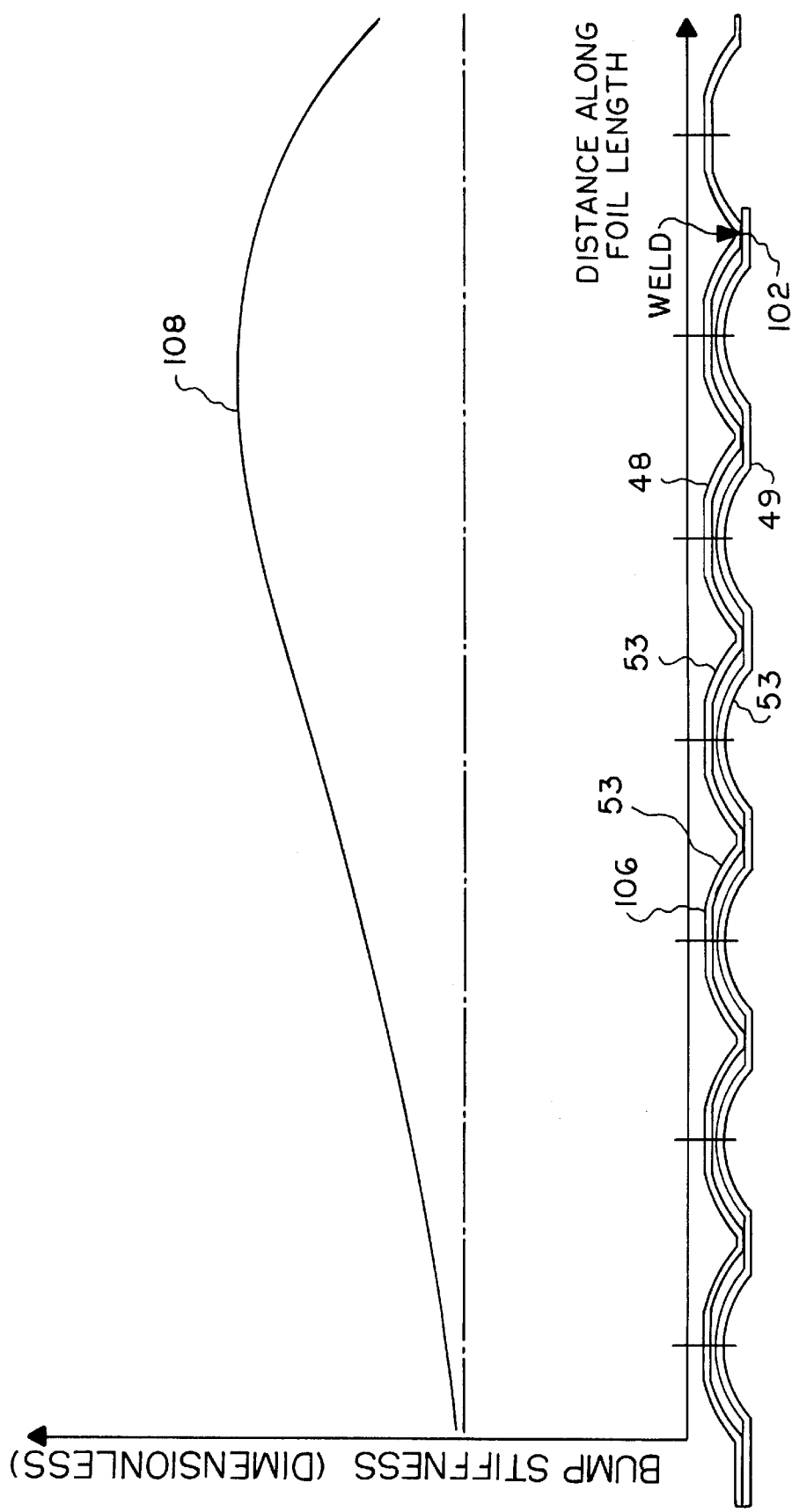
FIG. 4 is a side edge view of the bump foils therefor and a graph illustrating bump stiffness over the length circumferentially thereof.
Figure 5:
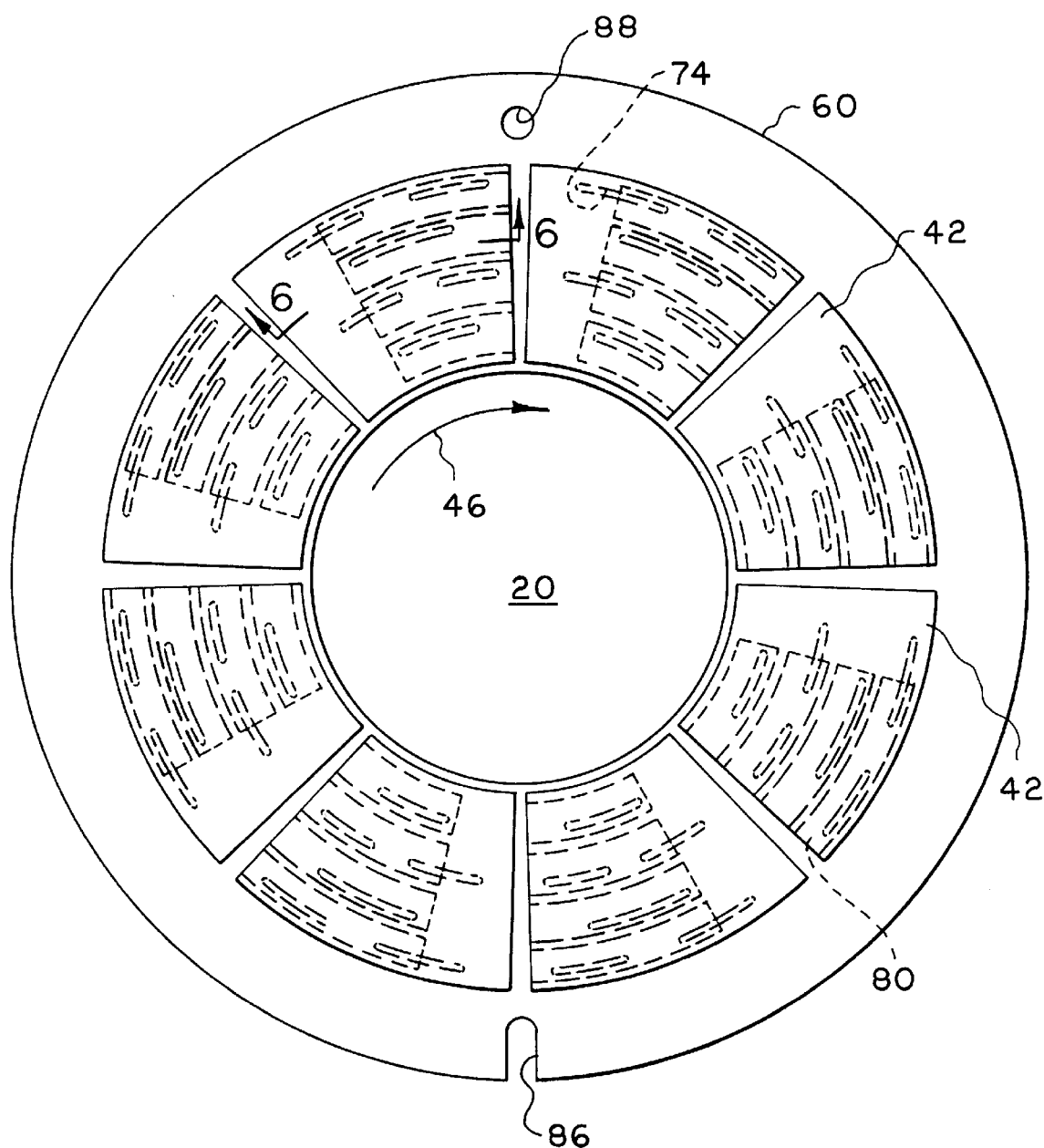
FIG. 5 is a plan view illustrating the spatial relation of resilient strips underlying smooth top sheets thereof.

Referring back to FIG. 3 as well as to FIG. 4, a bump 53 of smaller height and length of bump foil 49 underlies each of the bumps of bump foil 48. Under light loads, the bumps of the outer foils 48 are in resilient contact with the flexible membrane 60 to which the smooth compliant sheets 42 are attached. As the applied load increases, the outer foil bumps deflect to a greater extent causing the inner foil bumps to bearingly contact the outer foil bumps to thus provide a desired higher stiffness at higher loads. As seen in FIG. 3, the inner foil bumps may terminate short of the outer foil bumps at the leading edge in order to make the leading edge softer than the trailing end portion of the respective bearing pad.

The outer and inner foils 48 and 49 respectively have radially-extending portions or furrows 98 and 100 respectively which are not penetrated by slits 104 and which lie along the trailing edges thereof (more specifically, the portions 98 and 100 are spaced from the trailing edges by the length of a bump 53). The bump foils 48 and 49 along with the resilient flats 66 are spot-welded to the flexible diaphragm 62 by means of a single set of spot-welds, illustrated at 102, along the furrows 98 and 100, or otherwise suitably attached. The slits, illustrated at 104, which define the side-by-side strips 50, extend circumferentially from portions 98 and 100 respectively on each side thereof to the respective leading and trailing edges whereby the strips 50 may flex generally independently of other strips to enhance conformity of the smooth sheets 42 radially.

When the inner and outer bumps are deforming axially together, they undergo some circumferential and/or radial displacement to achieve the desired stiffness and damping characteristics. However, if the bumps have perfect semi-circular shapes, they will have a tangential line contact, and one arcuate bump inside another bump may not easily move longitudinally (circumferentially), i.e., the bumps may lock up resulting in drastic increase in their stiffness, and they may deform permanently. As seen in FIG. 4 (but not shown in FIG. 3), in order to prevent such a tangential line contact so as to accommodate sliding of the inner foil bumps, the bumps 53 of the outer foil 48 have flat or truncated top or apex portions 106. By "apex portion" is meant, for the purposes of this specification and the claims, the outermost portion of a bump, i.e., the portion which engages a sheet or foil such as flexible membrane 60. Alternatively, the lower foil bumps may instead have truncated apex portions, or the bumps of both foils may have such truncated apex portions.

FIG. 4 illustrates at 108 the stiffness of the bumps under a uniform loading of an arbitrary load. For the zero-friction case, the stiffness is the same for all bumps. When friction is introduced, the bumps near the fixed end (at the spot-weld 102) have much higher stiffness than the bumps near the free end. This is considered to be due to a high horizontal reactive force directed toward the fixed end by the accumulation of frictional forces acting toward the fixed end, Thus, in order to provide a suitable stiffness gradient to generate the tapered/land configuration under hydrodynamic loading, the bump foils 48 and 49 are accordingly attached to the flexible diaphragm 62 at portions 98 and 100 respectively near their trailing edges, as previously discussed, and their trailing edges are aligned with the trailing edges respectively of the flexible smooth top sheets 42. The circumferential slits 104 are provided to achieve a radially crowned configuration, i.e., flexibility in the radial direction, in conjunction with the circumferential tapered configurations illustrated in FIG. 6, and to enhance roll capacity of the bearing. The resilient flat strips 66 are provided to achieve circumferential stiffness as well as a smooth footing, i.e., to prevent interference of the bumps with the flexible diaphragm slots 92.

Referring to FIG. 12, there is illustrated generally at 110 an alternative arrangement of outer and inner bump foils 112 and 114 respectively, which are similar to bump foils 48 and 49 respectively except as otherwise stated or shown. Inner foil 114 has a plurality of bumps 116 of gradually decreasing height toward one edge 115. These bumps are separated by relatively long furrows 118. Outer foil 112 has a plurality of bumps 120 and 122 also of gradually decreasing height toward the same edge 115 and being higher than corresponding bumps 116, and relatively narrow furrows 124 extend between the outer foil bumps. For the reasons previously discussed, bumps 120 (and, if desired, bumps 122 also) have truncated or flat apex portions 126. In order to provide three or more levels of stiffening so as to provide an isolation feature to the bearing assembly 44 thus increasing its shock loading capacity, in accordance with the present invention, inner foil bumps or ridges 116 underlie some 120 of the outer foil bumps or ridges while the relativity long segments or flat portions or furrows 118 underlie others 122 of the outer foil bumps. Under moderate load, there is a clearance between the peaks or apexes of the inner foil bumps 116 and the corresponding outer foil bumps 120 whereby the load is supported with minimum rigidity by only the outer foil bumps 120 and 122. As load is further applied, it initially only deflects the outer bump foil 112 until the load is sufficient to bring the two bump foils 112 and 114 into contact. Continued increase of the load causes both bump foils to deflect increasing the stiffness over the bumps 120 but wherein there is still minimal stiffness over the bumps 122. The gradually decreasing heights of the bumps in bump foils 112 and 114 also provide a stiffness gradient circumferentially. It should therefore be understood that there are various alternatives for the sizes and shapes of the bumps in the bump foils. For example, the bumps in bump foils 112 and 114 may all be of equal heights. Such alternatives are meant to be embodied by the present invention.

Referring to FIGS. 9, 10, and 11, each of the crowning bump foils 68 has a plurality of radially extending bumps or ridges 120 for resiliently engaging the flexible diaphragm 62 and which are separated by flat furrows 122 for engaging the pedestal 41. Like the bump foils 48 and 49, an embodiment may alternatively be provided wherein the bumps 120 of these foils face the pedestal and/or the foils are sinusoidal in cross-section. Each crowning bump foil 68 lies in alignment under a respective set of resilient strips 80 and is similarly sized thereto. Each crowning bump foil 68 is tack-welded, as illustrated at 124, or otherwise suitably attached to the flexible diaphragm 62 along a radially extending portion 126 (apex of a bump 120) at generally its midspan. This leaves its leading and trailing edges free to thereby provide stiffening effects towards its middle (portion 126) to accordingly provide a crowning effect in cooperation with the other compliant elements that are stacked upon it.

The bumps 120 are preferably semi-conical in form, i.e., they increase in width and height from a width and height, illustrated at 128 and 130 respectively, at their radially inner ends to a width and height, illustrated at 132 and 134 respectively, at their radially outer ends, to provide the bearing with a softer outer periphery and thereby enhance self-alignment capability. For example, the dimensions 128, 130, 132, and 134 may be perhaps about 0.1, 0.05, 0.15, and 0.6 inch respectively for a bearing 40 having a diameter of perhaps about 6 inches.

Using principles commonly known to those of ordinary skill in the art to which this invention pertains, one will be able to construct a thrust bearing in accordance with the teachings contained herein.

It should be understood that, while the present invention has been described in detail herein, the invention can be embodied otherwise without departing from the principles thereof, and such other embodiments are meant to come within the scope of the present invention as defined by the appended claims.

What is claimed is:

1. A compliant hydrodynamic fluid film thrust bearing comprising a backing member, a circumferential row of sectors of flexible sheets positioned to face a shaft runner for relative rotation therebetween and each having a leading portion and a trailing portion relative to relative shaft rotation, means for resiliently supporting said flexible sheets, and means including flexible strip means sandwiched between each of said trailing portions and said supporting means for providing an effect of circumferentially spaced raised lands, said resiliently supporting means comprising an inner corrugated element means and an outer corrugated element means each having a plurality of ridges and a plurality of furrows in alternating relation therewith wherein inner element ridges supportively underlie some of said outer element ridges and whereby inner element furrows underlie others of said outer element ridges.

2. A bearing according to claim 1 wherein trailing edge portions of said flexible strip means are attached to said flexible sheets respectively.

3. A bearing according to claim 1 wherein said flexible strip means comprises a group of radially side-by-side strips.

4. A bearing according to claim 1 wherein said resiliently supporting means includes at least one circumferential row of corrugated elements.

5. A bearing according to claim 1 further comprising a flexible diaphragm means underlying said resiliently supporting means, and means between said flexible diaphragm means and said backing member for resiliently supporting said flexible diaphragm means.

6. A bearing according to claim 5 wherein said flexible diaphragm means supporting means comprising a circumferential row of foil element means having a corrugated shape for resiliently bearing said flexible diaphragm means, the bearing further comprising means for attaching a circumferentially intermediate portion of each of said foil element means to said flexible diaphragm means so that said foil element means are aligned respectively with said flexible strip means.

7. A bearing according to claim 6 wherein said foil element means includes slit means extending circumferentially from said intermediate portion to each of circumferential edges of said foil element means.

8. A bearing according to claim 6 wherein said foil element means has a plurality of ridges which increase in width and height as they extend radially outwardly.

9. A bearing according to claim 1 further comprising flexible strip means disposed between said resiliently supporting means and said flexible diaphragm.

10. A bearing according to claim 9 wherein said flexible diaphragm means is a single member and includes a plurality of slit means therein.

11. A bearing according to claim 1 wherein said resiliently supporting means includes flexible membrane means attached to said backing member, said flexible strip means sandwiched between each of said trailing portions and said flexible membrane means.

12. A bearing according to claim 11 wherein said resiliently supporting means further includes at least one circumferential row of corrugated elements disposed between said flexible membrane means and said backing member for resiliently bearing said flexible membrane means.

13. A bearing according to claim 11 wherein leading edges of said flexible sheets are attached to said flexible membrane means, trailing edges of said flexible sheets being free of attachment.

14. A bearing according to claim 1 wherein said ridges of at least one of said inner and outer corrugated element means have truncated apex portions.

15. A compliant hydrodynamic fluid film thrust bearing comprising a backing member, flexible sheet means positioned to face a shaft runner for relative rotation therebetween, means comprising an inner and an outer corrugated element means disposed between said backing member and said sheet means for resiliently supporting said sheet means, said outer corrugated element means having a corrugated shape defining a plurality of ridges and a plurality of furrows in alternating relation therewith for bearing said sheet means, and said inner corrugated element means having a corrugated shape defining a plurality of ridges and a plurality of furrows in alternating relation such that ridges of one of said inner and outer corrugated element means are in alignment with some of said ridges of an other of said inner and outer corrugated element means for bearing said sheet means and such that furrows of said one corrugated element means are in alignment with others of said ridges of said other of said corrugated element means.

16. A bearing according to claim 15 wherein inner foil ridges supportively underlie some of said outer foil ridges and inner foil furrows underlie others of said outer foil ridges.

17. A bearing according to claim 15 wherein said ridges of at least one of said inner and outer corrugated element means have truncated apex portions.

18. A compliant hydrodynamic fluid film bearing comprising a backing member, flexible sheet means positioned to face a shaft for relative rotation therebetween, means comprising an inner and an outer corrugated element means disposed between said backing member and said sheet means for resiliently supporting said sheet means, said outer corrugated element means having a corrugated shape defining a plurality of ridges and a plurality of furrows in alternating relation therewith for bearing said sheet means, and said inner corrugated element means having a corrugated shape defining a plurality of ridges and a plurality of furrows in alternating relation such that ridges of one of said inner and outer corrugated element means are in alignment with some of said ridges of an other of said inner and outer corrugated element means for bearing said sheet means and such that furrows of said one corrugated element means are in alignment with others of said ridges of said other of said corrugated element means.

19. A bearing according to claim 18 wherein said ridges of at least one of said inner and outer corrugated element means have truncated apex portions.

20. A bearing according to claim 18 wherein inner foil ridges supportively underlie some of said outer foil ridges and inner foil furrows underlie others of said outer foil ridges.

* * * * *